US011055557B2

(12) United States Patent
Chatterjee et al.

(10) Patent No.: US 11,055,557 B2
(45) Date of Patent: Jul. 6, 2021

(54) AUTOMATED EXTRACTION OF PRODUCT ATTRIBUTES FROM IMAGES

(71) Applicant: Walmart Apollo, LLC, Bentonville, AR (US)

(72) Inventors: Anirban Chatterjee, District-Howrah (IN); Bodhisattwa Prasad Majumder, Kolkata (IN); Gayatri Pal, Kodigehalli (IN); Rajesh Shreedhar Bhat, Kumta (IN); Sumanth S. Prabhu, Bangalore (IN); Vignesh Selvaraj, Coimbatore (IN)

(73) Assignee: Walmart Apollo, LLC, Bentonville, AR (US)

(*) Notice: Subject to any disclaimer, the term of this patent is extended or adjusted under 35 U.S.C. 154(b) by 149 days.

(21) Appl. No.: 15/982,675

(22) Filed: May 17, 2018

(65) Prior Publication Data
US 2019/0311210 A1  Oct. 10, 2019

(30) Foreign Application Priority Data

Apr. 5, 2018  (IN) ............................. 201841012953

(51) Int. Cl.
*G06K 9/00* (2006.01)
*G06K 9/32* (2006.01)
(Continued)

(52) U.S. Cl.
CPC ......... *G06K 9/325* (2013.01); *G06F 16/3334* (2019.01); *G06F 16/58* (2019.01);
(Continued)

(58) Field of Classification Search
CPC .. G06K 9/325; G06K 9/3241; G06F 16/3334; G06F 16/58; G06F 17/2765; G06N 5/046; G06N 20/00
See application file for complete search history.

(56) References Cited

U.S. PATENT DOCUMENTS

2004/0143600 A1  7/2004  Musgrove et al.
2006/0294094 A1* 12/2006  King .................... G06K 9/685
(Continued)

FOREIGN PATENT DOCUMENTS

CN  106569998 A  4/2017
CN  106960206 A  7/2017
(Continued)

OTHER PUBLICATIONS

Ling et al, (Topic Detection from Microblogs Using T-LDA and Perplexity, 2017 24th Asia-Pacific Software Engineering Conference Workshops, IEEE, pp. 71-77) (Year: 2017).*
(Continued)

*Primary Examiner* — Amara Abdi

(57) ABSTRACT

The system and method described herein provide for a machine-learning model to automate determination of product attributes for a product based on images associated with the product. The product attributes can be used in online commerce to facilitate product selection by a customer. In accordance with this disclosure, the product attributes may be determined using machine-learning technology by processing images associated with the product (including product packaging). The machine-learning technology is trained using product-related vocabulary and potential attributes that can be discovered by analyzing the images associated with the product.

20 Claims, 7 Drawing Sheets

(51) Int. Cl.
*G06N 5/04* (2006.01)
*G06N 20/00* (2019.01)
*G06F 16/58* (2019.01)
*G06F 16/33* (2019.01)
*G06F 40/279* (2020.01)

(52) U.S. Cl.
CPC ......... *G06F 40/279* (2020.01); *G06K 9/3241* (2013.01); *G06N 5/046* (2013.01); *G06N 20/00* (2019.01)

(56) References Cited

U.S. PATENT DOCUMENTS

| | | | |
|---|---|---|---|
| 2010/0185569 A1* | 7/2010 | Hu | G06F 16/353 706/12 |
| 2011/0085697 A1 | 4/2011 | Clippard et al. | |
| 2011/0153577 A1* | 6/2011 | Dean | G06F 16/93 707/693 |
| 2012/0117072 A1* | 5/2012 | Gokturk | G06Q 30/0278 707/740 |
| 2012/0158482 A1* | 6/2012 | Paradise | G06Q 30/0633 705/14.25 |
| 2014/0156346 A1* | 6/2014 | Cai | G06Q 50/01 705/7.31 |
| 2015/0363625 A1* | 12/2015 | Wu | G06K 9/00664 382/203 |
| 2016/0110794 A1* | 4/2016 | Hsiao | G06K 9/00677 705/26.7 |
| 2016/0283998 A1 | 9/2016 | Pathak | |
| 2016/0321358 A1* | 11/2016 | Kanani | G06Q 30/00 |
| 2018/0189620 A1* | 7/2018 | Sheth | G06F 40/279 |
| 2020/0410678 A1* | 12/2020 | Song | G16H 50/70 |

FOREIGN PATENT DOCUMENTS

| | | | | |
|---|---|---|---|---|
| CN | 107122416 | * | 9/2017 | ......... G06F 16/3344 |
| CN | 107122416 A | | 9/2017 | |
| CN | 107203606 A | | 9/2017 | |
| CN | 107346420 A | | 11/2017 | |
| CN | 107563498 A | | 1/2018 | |
| WO | 2017113232 A1 | | 7/2017 | |

OTHER PUBLICATIONS

Tian et al, (detecting text in natural image with connectionist text proposal network, Sep. 2016), (provided by Applicant). (Year: 2016).*

Baoguang et al (An End-to-End Trainable Neural Network for Image-Based Sequence Recognition and Its Application to Scene Text Recognition, IEEE transactions on pattern analysis and machine intelligence, vol. 39, No. 11, Nov. 2017). (Year: 2017).*

Wang et al ("End-to-End Text Recognition with Convolutional Neural Networks", IEEE 2012 (Year: 2012).*

Jaderberg et al ("Reading Text in the Wild with Convolutional Neural Networks", Springer, Int. J. Comput. Vis (2016) 116:1-20 (Year: 2016).*

Copenheaver, Blaine R., "Written Opinion", International Application No. PCT/US2019/023490, dated Jun. 25, 2019, 7 pages.

Copenheaver, Blaine R., "International Search Report", International Application No. PCT/US2019/023490, dated Jun. 25, 2019, 2 pages.

Hui Li et al., "Towards End-to-end Text Spoiling with Convolutional Recurrent Neural Networks", The University of Adelaide, and Australian Centre for Robotic Vision, Northwestern Polytechnical University, 2017, pp. 5238-5246.

Zhi Tian et al., "Detecting Text in Natural Image with Connectionist Text Proposal Network", arXiv:1609.03605v1 [cs.CV], Shenzhen Institutes of Advanced Technology, University of Oxford, The Chinese University of Hong Kong, Sep. 12, 2016, pp. 1-16.

Ajinkya More, "Product Matching in eCommerce using deep learning", WalmartLabs, https://medium.com/walmartlabs/product-matching-in-ecommerce-4f19b6aebaca, Mar. 21, 2018, pp. 1-16.

* cited by examiner

AUTOMATED EXTRACTION OF PRODUCT ATTRIBUTES FROM IMAGES

BACKGROUND

This disclosure relates to the field of data processing, and more particularly to product descriptions. Online retailers strive to present customers with detailed product descriptions to enable the customer to make an informed selection among the available products. However, the voluminous and expanding quantity of products that may be offered can make product selection difficult for a customer. Furthermore, when product descriptions are incomplete or unstructured, a customer may be unable to locate a product of interest. A customer may rely on pictures of products to learn more about each product. Therefore, an online retailer may store and present many pictures of various products to a potential customer. It is generally accepted that presenting more product information to a customer will aid product selection and increase customer satisfaction. Furthermore, tools that enable customers to quickly locate and select a product may facilitate a buying decision and increase sales.

SUMMARY

This Summary is provided to introduce a selection of concepts (in a simplified form) that is further described below in the Detailed Description. This Summary is not intended to identify key features or essential features of the claimed subject matter, nor is it intended to be used as an aid in determining the scope of the claimed subject matter.

This disclosure provides a technique for supplementing product information using product attributes. The product attributes may be determined using computer technology by processing images associated with the product (including product packaging). In one aspect, machine learning techniques are used to provide end-to-end automation and efficient extraction of product attributes from the images.

One innovative aspect of the subject matter described in this disclosure can be implemented as method, system, or apparatus, including computer programs encoded on computer-readable media. The method, system, or apparatus may include a processor and memory for implementing the described techniques. The technique may include obtaining at least a first product image associated with the product. The first product image may be processed using a machine learning system to determine one or more attributes regarding the product. The technique may include causing the one or more attributes regarding the product to be stored in a database used to generate an online description of the product.

In some implementations, the first product image may depict a packaging of the product. The packaging may include textual information about the product.

In some implementations, processing the first product image may include performing text detection to locate at least a first text portion in the first product image, performing text recognition to determine a text sequence in the first text portion, and determining the one or more attributes regarding the product based, at least in part, on the text sequence.

In some implementations, the text detection may be performed by a text detection module of the machine learning system. The text recognition may be performed by a text recognition module of the machine learning system. The one or more attributes may be determined by an attribute tagging module of the machine learning system.

In some implementations, the technique may include generating synthetic images that include product-related vocabulary, and training the text recognition module using the synthetic images.

In some implementations, the attribute tagging module may be configured to determine a token for each word in a sentence output from the text recognition module, the token being either a starting token of a first attribute, a continuing token of the first attribute, or a disregard token if the word is unrelated to the first attribute.

In some implementations, the technique may include training the attribute tagging module to identify words associated with each of a plurality of product attributes.

In some implementations, the text detection module may implement a connectionist text proposal network. The text recognition module may implement a convolutional neural network. The attribute tagging module may implement an attribute sequence recognition system.

In some implementations, the text recognition module includes an attention layer.

In some implementations, the attribute sequence recognition system may include a bidirectional long short-term memory layer with a conditional random field layer.

In some implementations, the attribute sequence recognition system may further include an attention layer.

Details of one or more implementations of the subject matter described in this disclosure are set forth in the accompanying drawings and the description below. Other features, aspects, and advantages will become apparent from the description, the drawings, and the claims.

BRIEF DESCRIPTION OF THE DRAWINGS

The present description will be better understood from the following detailed description read in light of the accompanying drawings.

Corresponding reference characters indicate corresponding parts throughout the drawings. The systems depicted in the figures are illustrated as schematic drawings. Note that the relative dimensions of the figures may not be drawn to scale.

DETAILED DESCRIPTION

Figure 1:
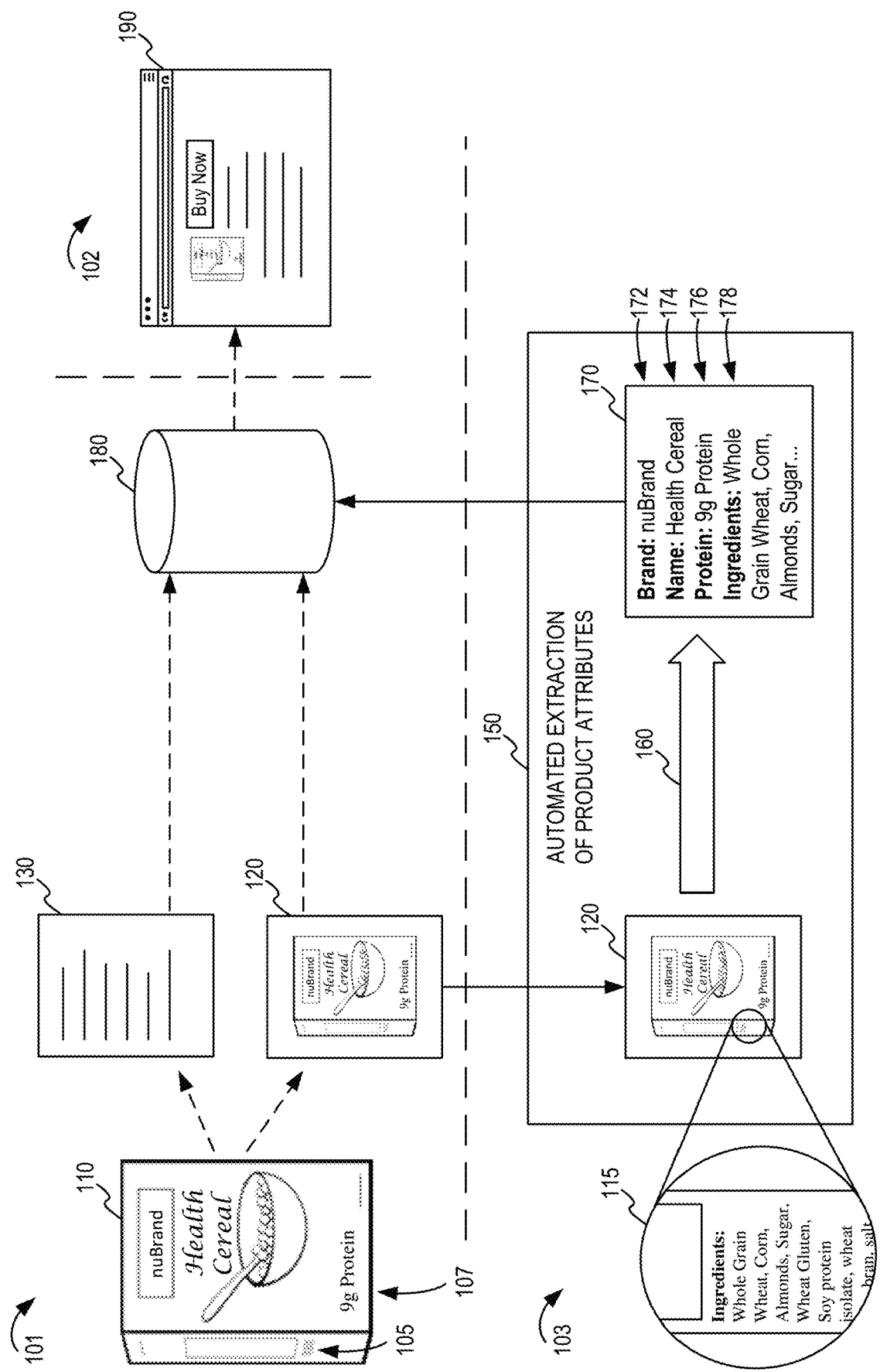
FIG. 1 depicts an example system diagram showing an overview of online commerce enhanced with innovative aspects of this disclosure.

The systems and methods described herein are related to a machine learning system that can be used to generate or augment a product description. An online retailer may catalog a large quantity of products available for purchase by a customer. A database (or databases) may be used to store such information as a product description, one or more images, pricing information, inventory, or the like. Product attributes may be used to describe a product in a way that can be searched, sorted, or filtered. By storing product attributes in a structured format, an online retailer may present the product attributes to a customer in a manner that facilitates a product selection and purchasing decision. Examples of product attributes may include, without limitation, the following: brand, list of ingredients, manufacturer part number, package quantity, hardware specification (such as a number of megapixels in camera, hard drive capacity, hard drive internal memory, processing speed of a computer product, memory of a computer product, television screen size, display resolution, or the like), clothing-related information (such as a shoe size, sleeve style, or the like), seating capacity of a vehicle, style of vehicle, or the like. While a product description may include some of the details associated with a product, the product description may be incomplete or inaccurate. Furthermore, the product description may not be structured in a way that permits searching, sorting, or filtering based on a product attribute that is relevant to a particular type of product. There may be useful product information that appears in product images (such as pictures of the packaging associated with a product).

In accordance with this disclosure, a machine-learning system may automate the determination of product attributes by analyzing images associated with a product. A technique for determining product attributes from a product image may be referred to as "attribute extraction" because the attributes are identified (extracted) by analyzing information embedded in the product image. After the machine-learning system determines the product attributes, the product attributes may be stored in a database for later use in online commerce to facilitate product selection by a customer. The machine-learning system may include a text detection module, a text recognition module, and an attribute tagging module. A text detection module may analyze an image to identify relevant portions of the image that may contain textual information. The relevant portions may be passed to the text recognition module to determine the textual information in the form of word and character encodings. An attribute tagging module may analyze the word and character encodings based on a sequence labeling algorithm that discerns which words (or characters) are related to a particular product attribute and which enforces attribute sequence constraints or rules. The attribute tagging module generates one or more attributes regarding the product based on the textual information.

In one aspect of this disclosure, the machine-learning model may use multiple concepts associated with machine-learning (which also may be referred to artificial intelligence). For example, the text detection module may implement a connectionist text proposal network (which is based on a recurrent neural network design) to identify potential areas of text in an image. The text detection module may identify one or more textual image portions. The text recognition module may implement a convolutional neural network together with long short-term memory (LSTM). The text recognition module may encode visual features of the textual image portions and determine word and character encodings (which also may be referred to as words or character strings). The attribute tagging module may implement a bidirectional LSTM (BiLSTM) layer with a conditional random field (CRF) layer. In some implementations, a BiLSTM layer may have an intuitive advantage over standard LSTMs because they have access to previous and the next state information as opposed to LSTMs which may only have previous state information. In other implementations, other types of neural networks could be used, including bidirectional gated recurrent units (BiGRUs) or other types of architectures. The CRF layer may be used to refine an attribute sequence encoding by matching patterns of words with potential product attributes.

In some implementations, the machine-learning system may be trained to improve the accuracy and efficiency of the attribute extraction. For example, the text recognition module may be trained using product-related vocabulary (such as a training vocabulary made up of terms that are relevant to the online retailer or online commerce). Synthetic images may be generated based on the training vocabulary and used to train the text recognition module. The training vocabulary may include terms or character sequences that are not proper words (such as English language terms), but which are commonly understood by consumers, including acronyms, shorthand, or even non-standard characters. In addition to training the text recognition module, the attribute tagging module also may be trained to identify potential term sequences associated with product attributes.

In some implementations, an attention layer may be used in one or more of the text detection module, the text recognition module, or attribute tagging module. The attention layer may improve efficiency of the machine-learning system by drawing attention to potential likely locations of product attributes or likely term patterns associated with product attributes.

The machine-learning system in this disclosure may provide an end-to-end automation for attribute extraction. The machine-learning system process combines multiple machine-learning techniques to identify the source of the attribute information (such as the text within a product image), filtering out noise from the source, process the filtered information, and categorizing the information based on a possible set of attributes. By combining (stacking) the multiple machine-learning techniques in a sequence, the output of one module provides the input for the next module. Thus, the machine-learning system may fully automate the process of attribute extraction. The input to the machine-learning system is one or more product images which are processed as described in this disclosure to provide the output of product attributes in a format that can easily be integrated into a product attribute table of a database.

Particular implementations of the subject matter described in this disclosure can be implemented to realize one or more of the following potential advantages. Customers may use product attributes presented on an ecommerce page to search, sort, or filter available products from the online retailer. Rich product descriptions and pages may be generated to draw additional visibility to particular products that have a desirable product attribute. Online search sites and product aggregators may benefit by having additional product information which describes a product. Batches of images may be processed more quickly and with greater accuracy using the machine-learning systems described in this disclosure.

FIG. 1 depicts an example system diagram showing an overview of online commerce enhanced with innovative aspects of this disclosure. A top portion 101 of FIG. 1 shows a traditional ecommerce model to sell a product 110. A product description 130 and a product image 120 (or multiple product images) may be stored in a database 180. The product description 130 and the product image 120 may come directly from the online retailer or may be provided by a third-party seller which is using the online retailer as an aggregated sales channel. From a customer perspective 102, a web browser 190 may receive the product description 130 and the product image 120 in the form of a web page (or other representation of the product which is formatted in a manner that permits selection and/or purchase of the product). It should be understood that the web browser 190 and the web page are merely examples of an online ecommerce platform. The web browser 190 may be implemented on a customer's client machine, mobile phone, or any other device which is capable of accessing content from the online retailer.

In the example of FIG. 1, the product 110 may be a cereal box which has some information that may not be included in the product description 130. For example, the cereal box may indicate a quality of the cereal referenced by arrow 107 (the textual information "9 g protein"). Furthermore, there may be other textual information (such as an ingredient list) printed on the cereal box. In the example of FIG. 1, the ingredient list is referenced by arrow 105. The brand (e.g., "nuBrand") and name of the product (e.g., "Health Cereal") may or may not be included in the product description 130. Even if that information is included in the product description 130, it may not be formatted in a way that permits easy searching, sorting, or filtering of products. By storing product attributes (including the brand) as a structured data or in a product attribute table, the online retailer may facilitate easier product selection. For example, the web page may provide a drop down or other selection means that permits a customer to quickly locate all cereals provided by "nuBrand" if there is a product attribute that stores brand names for the cereals.

In a bottom portion 103, FIG. 1 shows a machine-learning system 150 in accordance with some implementations of this disclosure. The machine-learning system 150 may provide automated attribute extraction using the product image 120. The product image 120 may be obtained by the machine-learning system 150 by a variety of ways. For example, the machine-learning system 150 may automatically retrieve the product image 120 from the database 180 or from another repository of product images. Alternatively, the product image 120 may be provided to the machine-learning system 150 during an uploading or onboarding process associated with adding a new product to the database 180. Although shown as a single product image 120, the machine-learning system 150 may process batches of multiple product images. In some implementations, the product image 120 may be resized, cropped, or otherwise modified to prepare for data processing. The product image 120 may include the text information that is on the packaging (cereal box). A blow up 115 of the ingredient list is provided for reference.

Figure 2:
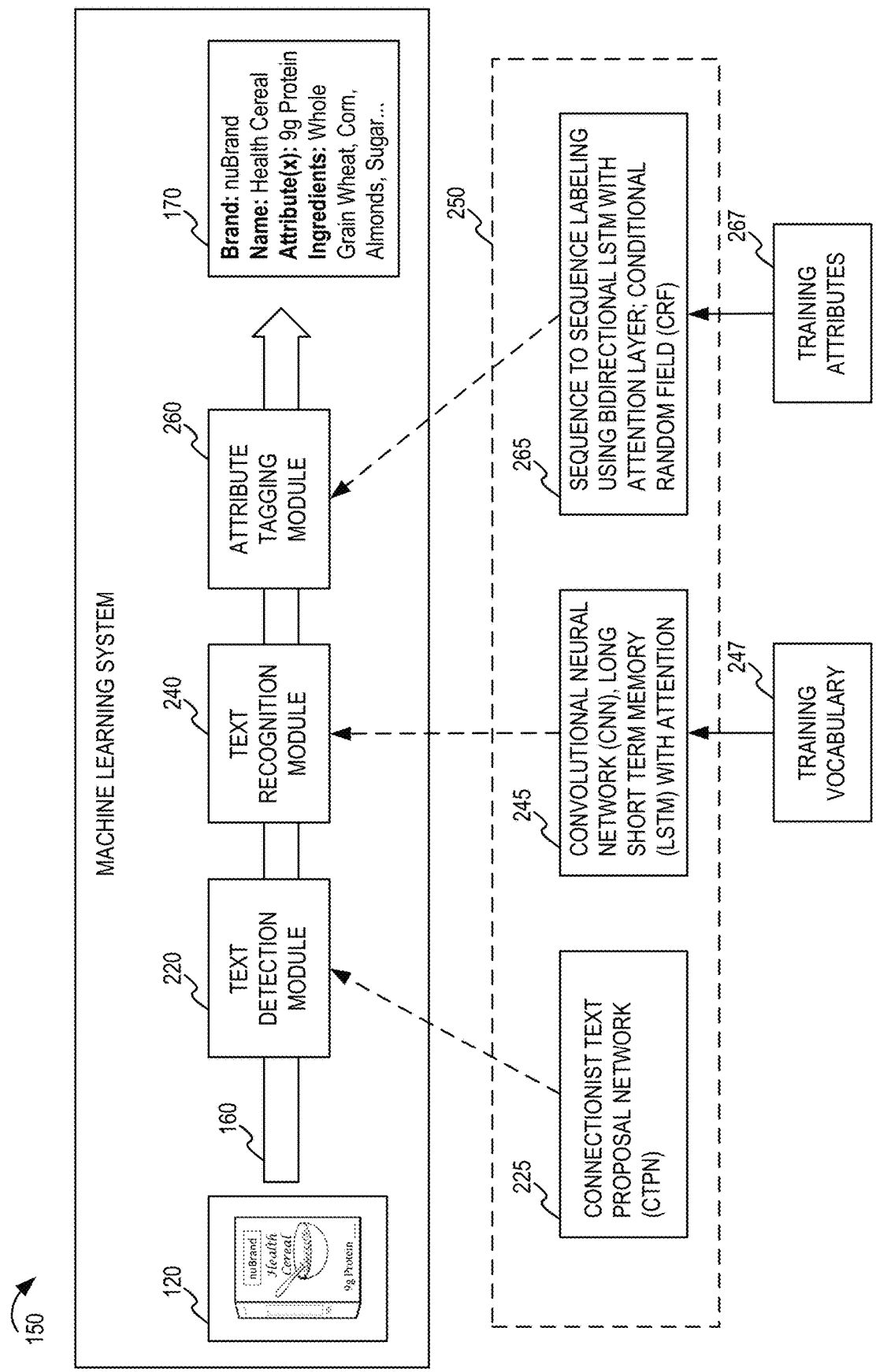
FIG. 2 depicts an example system diagram of a machine learning system for automated extraction of product attributes from an image.

Through a process of attribute extraction 160, which is described in more detail in FIG. 2), the machine-learning system 150 may determine one or more attributes 170 regarding the product 110. In the example of FIG. 1, the attributes 170 include a brand 172, a product name 174, a protein attribute 176, and an ingredient list 178. The list of attributes in FIG. 1 is an abbreviated list based on the example product in FIG. 1. It may be recognized that the attributes 170 may be specific to the type of product. For example, an ingredient list attribute may be relevant to food-type products. Other attributes (such as a display resolution) may be relevant to electronics-type products but not food-type products, and vice versa. The attributes may enable better customer selection (and ultimately higher customer satisfaction) by providing product data in a way that may be useful. For example, if a customer is allergic to a particular ingredient (such as gluten), the customer may filter products based on the ingredient list attribute. By storing the attributes 170 in the database 180, the online retailer can make this information available to customers as well as enabling additional logic in the ecommerce platform.

FIG. 2 depicts an example system diagram of a machine learning system for automated extraction of product attributes from an image. The machine-learning system 150 shows the process of attribute extraction 160 which analyzes the product image 120 to generate one or more product attributes 170. As shown in FIG. 2, the machine-learning system 150 may include a text detection module 120, a text recognition module 240, and an attribute tagging module 260. The product image 120, the text recognition module 240, and the attribute tagging module 260 may be implemented in the same computing apparatus or in a plurality of computing apparatuses. In some implementations, the modules may be implemented as software executed by a processor (or processors) of a computing apparatus. The computing apparatus may use a specialized hardware, such as a graphics processing unit (GPU) or other component which is capable of performing the calculations associated with machine-learning algorithms. The machine-learning system 150 may utilize different concepts associated with machine-learning.

In some implementations, the text detection module 220 may use a first machine-learning technique 225. The first machine-learning technique 225 may include a connectionist text proposal network (CTPN). The CTPN may locate potential areas of text in an image. The CTPN may detect a text line in a sequence of fine-scale text proposals directly in convolutional feature maps. A vertical anchor mechanism may jointly predict location and a text/non-text score of each fixed-width proposal. The text/non-text score may improve localization accuracy. In some implementations, the CTPN may identify sequential proposals that are naturally connected by a recurrent neural network (RNN), which is seamlessly incorporated into the convolutional network. CTPN may be understood by persons of skill in the art. Therefore, the description of CTPN is abbreviated in this disclosure. The CTPN (or other technique in the text detection module 220) may identify image portions of the product image 120 which are likely to include textual information. Those image portions may be passed from the text detection module 220 to the text recognition module 240 for further analysis.

In some implementations, the text recognition module 240 may use a second machine-learning technique 245. For example, the second machine-learning technique 245 may include a convolutional neural network (CNN) with LSTM. The second machine-learning technique 245 may be used to determine a sequence of characters in the image portions. In one implementation the image portion may be resized to a uniform height. Then, a sliding CNN is performed on the image portion to identify potential character portions. A LSTM layer is stacked on top of the CNN to store the character portions. A word character decoder may optimize the scoring from the LSTM layer to identify the word and character information. In some implementations, an attention layer (also referred to as an attention mechanism) may be used to draw visual attention to part of the image portion. The attention layer includes weight values that emphasize the areas which should receive greater visual attention by the word character decoder. In some implementations, the text recognition module 240 may be trained using a training vocabulary 247. The training vocabulary 247 may consist of synthetic images which are made up of product titles, descriptions, sample unigram or bigrams from a corpus of product-related vocabulary. The text recognition module 240 may be trained to optimize perplexity. In some implementations, the text recognition module 240 provided better results when the perplexity was reduced. Once the word character information is determined by the text recognition module 240, it is provided to the attribute tagging module 260.

The attribute tagging module 260 may use a third machine-learning technique 265. The third machine-learning technique 265 may include an attribute sequence recognition system. The attribute sequence recognition system may be based on a sequence labeling technique used in machine-learning. Sequence labeling is a type of pattern recognition task that involves the algorithmic assignment of a categorical label to each member of a sequence of observed values. Sequence labeling can be treated as a set of independent classification tasks, one per member of the sequence. However, accuracy is generally improved by making the optimal label for a given element dependent on the choices of nearby elements, using special algorithms to choose the globally best set of labels for the entire sequence at once. In some implementations, the attribute sequence recognition system may use a token-based approach in which a token is determined for each word in a word character sequence. The token may be either a starting token of an attribute, a continuing token of the attribute, or a disregard token if the word is unrelated to the attribute. A "BIO" sequence labeling technique is further described below.

In some implementations, the attribute tagging module 260 may implement an attention layer. The attention layer includes weight values that emphasize some word character sequences that are related to product attributes. In some implementations, the attribute tagging module 260 may be trained using training attributes 267. The training attributes 267 may consist of a list of potential attributes or keywords that are in a sequence of attributes. In some implementations, the attribute tagging module 260 is framed as sequence to sequence labelling task. The attribute tagging module 260 may be trained to improve the accuracy of the sequence labelling task.

Figure 3:
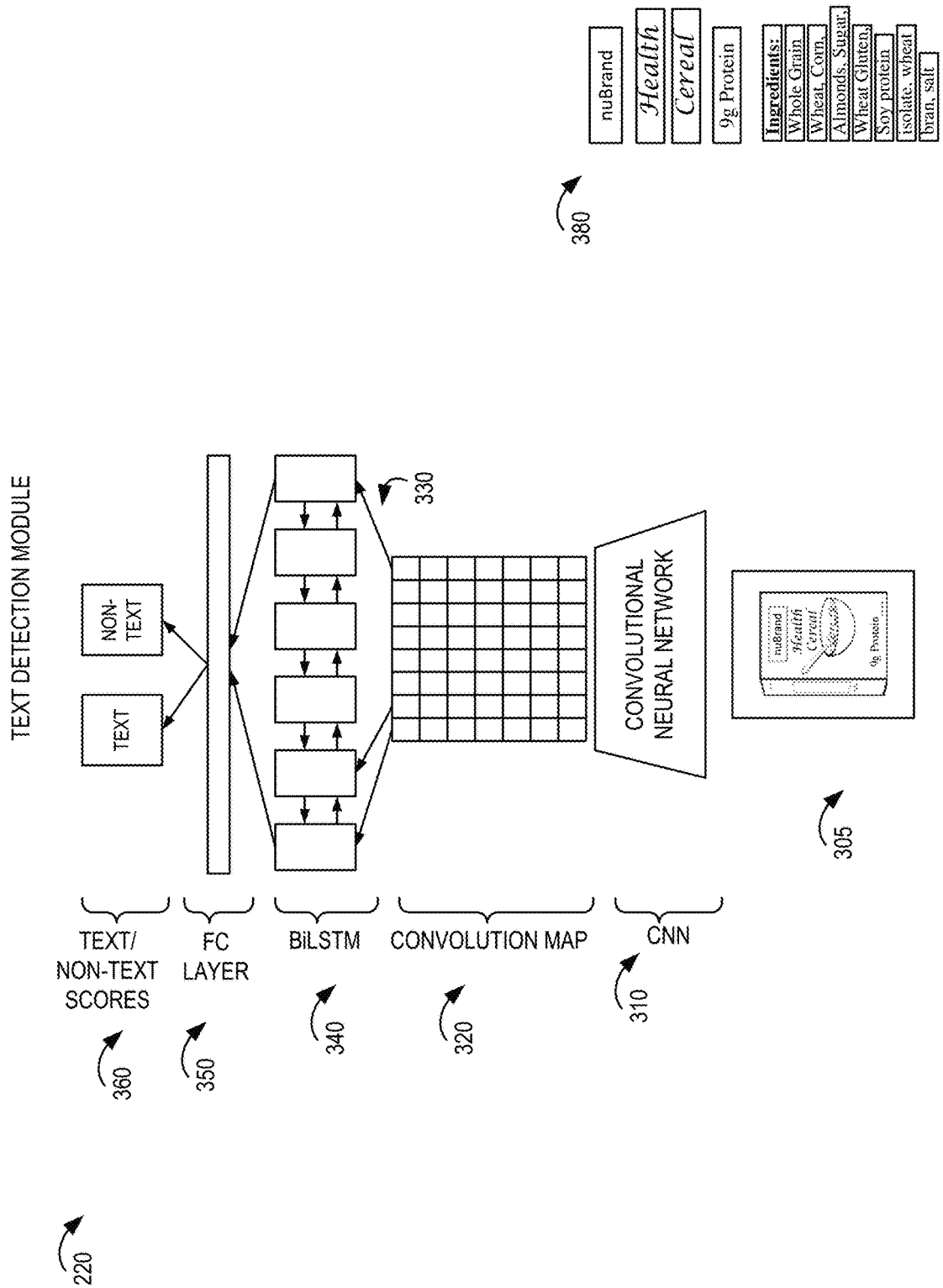
FIG. 3 depicts an example machine-learning technique for a text detection module.

FIG. 3 depicts an example machine-learning technique for a text detection module. The text detection module 220 may use a CTPN that includes a convolutional neural network 310 to convolve the product image 305 to smaller portions. The CNN 310 is used to encode the product image 305 into multiple concise numeric representations 320 each of which captures information about different regions of the product image 305. The numeric representations 320 of different patches are then sent to a BiLSTM layer 340 to capture the sequential nature of the text possibly contained in those image patches.

In some implementations, a recurrent process (shown at 330) may store data for the small portions (numeric representations 320) in the BiLSTM layer 340. The BiLSTM layer 340 may be used to score 360 the convolved sections. The scores 360 represent the likelihood that the convolved section includes text. In some implementations, a fully connected (FC) layer 350 may store a mathematical representation of the scores in relation to the BiLSTM layer 340. The text detection module 220 may optimize the scores 360 to determine where text is likely to be found in the image. The portions of the image that likely includes text is identified as a textual image portion, which is sent to the text recognition module 240. FIG. 3 shows several potential textual image portions 380 which may be detected in the product image 305.

It is useful to note that the CTPN is particular efficient in detecting text in a natural image which is different from traditional optical character recognition performed on a black-and-white page. Natural images may include a variety of backgrounds and may make the text detection process more complex. Using the CTPN has been shown to accurately locate potential areas of text.

There may be different ways to implement a text detection module 220. While the example in FIG. 3 is based on the CTPN, other techniques may be used. The CTPN may densely slide a 3×3 spatial window through the last convolutional maps (conv5) of a VGG16 model. VGG16 (also called OxfordNet) is a convolutional neural network architecture named after the Visual Geometry Group from Oxford, who developed it. The sequential windows in each row are recurrently connected by a BiLSTM, where the convolutional feature (3×3×C) of each window is used as input of the 256D BiLSTM (including two 128D LSTMs). The RNN layer is connected to a 512D fully-connected layer, followed by the output layer, which jointly predicts text/non-text scores, y-axis coordinates and side-refinement offsets of k anchors. The scoring calculation may be represented by the following formula:

$$L(s_i, v_j, o_k) = \frac{1}{N_s} L_s^{cl}(s_i, s_i^*) + \frac{\lambda_1}{N_v} \sum_j L_v^{re}(v_j, v_j^*) + \frac{\lambda_2}{N_o} \sum_k L_o^{re}(o_k, o_k^*)$$

Where $L_s^{ct}$—Error in text/non text score prediction
$L_v^{re}$—Error in coordinate prediction
$L_o^{re}$—Error in side-refinement
$s_i$, $s_i^*$—predicted probability of anchor i being a true text and ground truth
$v_j$, $v_j^*$—predicted and ground truth y-coordinates associated with the j-th anchor
$o_k$, $o_k^*$—predicted and ground truth offsets in x-axis associated to the k-th anchor
$\lambda_1$, $\lambda_2$—empirically set loss weights to balance different tasks
$N_s$, $N_v$, $N_o$—normalization parameters As the machine-learning system may be implemented with sequential modules, any text detection module may be used in combination with a text recognition module and an attribute tagging module.

Figure 4:
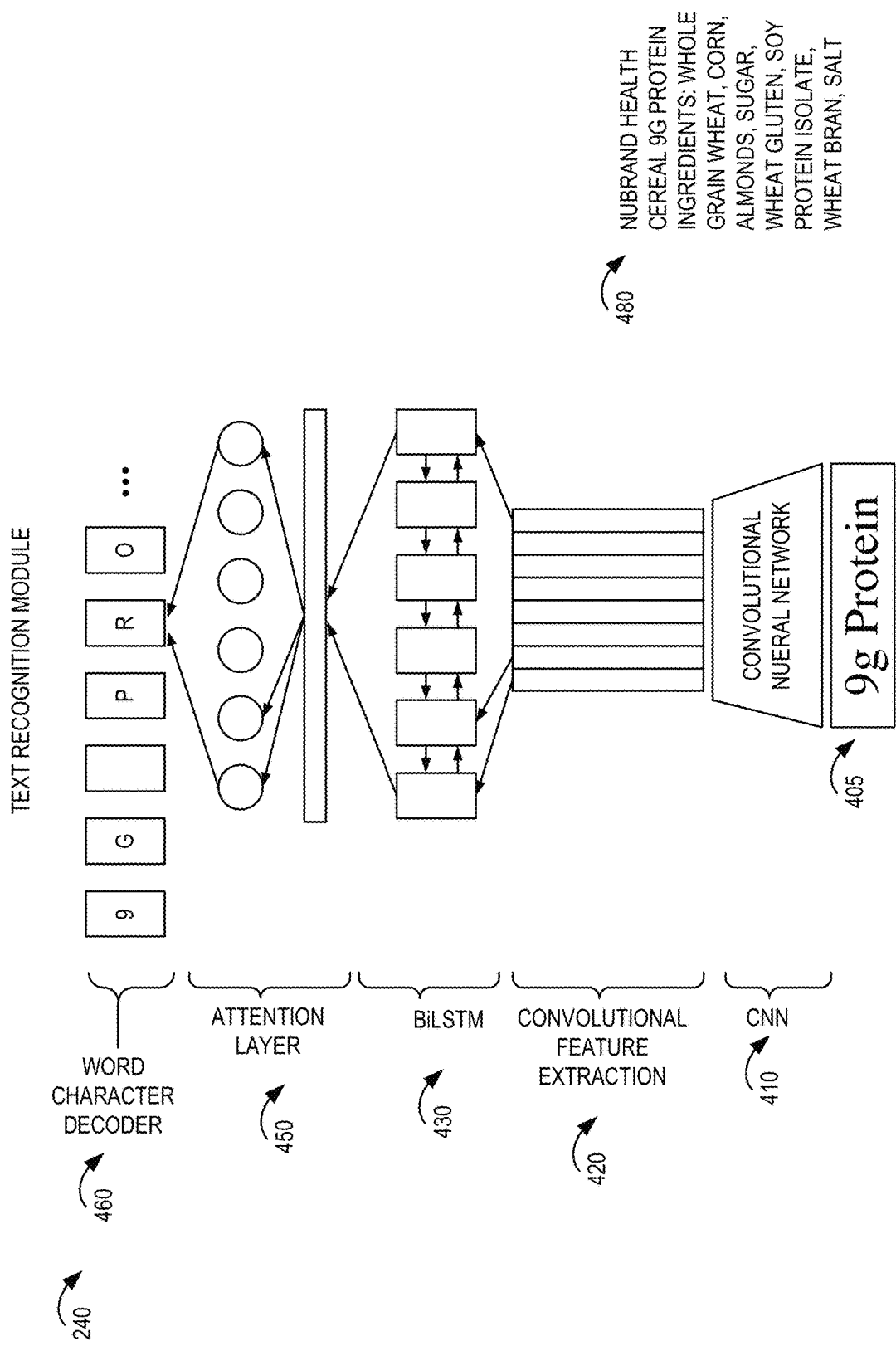
FIG. 4 depicts an example machine-learning technique for a text recognition module.

FIG. 4 depicts an example machine-learning technique for a text recognition module. The text recognition module 240 may use a CNN 410 to convolve sections of a textual image portion 405 into encoded representations of parts of the textual image portion 405. The convolutional feature extraction layer 420 may pass the encoded representations into a BiLSTM layer 430. There may be two sublayers in the BiLSTM layer 430. For example, one BiLSTM sublayer may act as an encoder that encodes the sequence of representations received from the convolutional feature extraction layer 420. The second BiLSTM sublayer may decode the representation received from the first BiLSTM sublayer conditioned on a vocabulary available during training. This vocabulary may include 86 different tokens including the English alphabet (small and capital) and other commonly used numeric and special characters in textual communication. The BiLSTM 420 may score the sections of potential text based on potential character portions. The scores 430 may represent a likelihood that the convolved sections includes a character. On top of this architecture, the text recognition module 240 may have an attention layer 450 to associate regions in the textual image portion 405 to generated characters (shown in the word character decoder layer 460). For example, if the text recognition module 240 is attempting to recognize the word "protein" from the textual image portion 405, the attention layer 450 may add emphasis on the part of the image contains the letter "p" when we generate the letter "p". This way the model is focusing on a certain section of the image while generating the corresponding character which would help give better results even if the text recognition module 240 were to encounter a word not seen before as long as the constituent characters come from our vocabulary. Thus, the attention layer 450 may modify the scores by using a weighting system. The weighted scores may be used in a word character decoder 460 which optimizes the weighted scores to determine word character encodings.

The text recognition module may include an algorithm to implement a sequential row encoder, the decoder which is trained as a conditional language model, and the attention layer. Mathematically, the algorithm may be represented by the following formula:

$$V_{hw} = RNN(V_{h,w-1}, V_{h,w})$$

$$p(y_{t+1} | y_1, \ldots, y_t, V) = softmax(W^{out} o_t)$$

$$o_t = \tanh(W^c[h_t; c_t])$$

$$h_t = RNN(h_{t-1}, [y_{t-1}; o_{t-1}])$$

$$c_t = \sum_{h,w} p(z_t = (h, w)) V_{hw}$$

$W^{out}$, $W^c$ represent linear Transformations $h \in \{1, \ldots, H\}$

H represents the number of rows the image has been split into $w \in \{1, \ldots, W\}$ W represents the number of columns the image has been split into $z_t$ represents the attention distribution $z_t \in \{1, \ldots, H\} \times \{1, \ldots, W\}$ FIG. 4 shows word character encodings 480 which may be detected by processing the textual image portions 380 from FIG. 3. The word character encodings 480 may form the basis of a sentence that is passed to the attribute tagging module.

Figure 5:
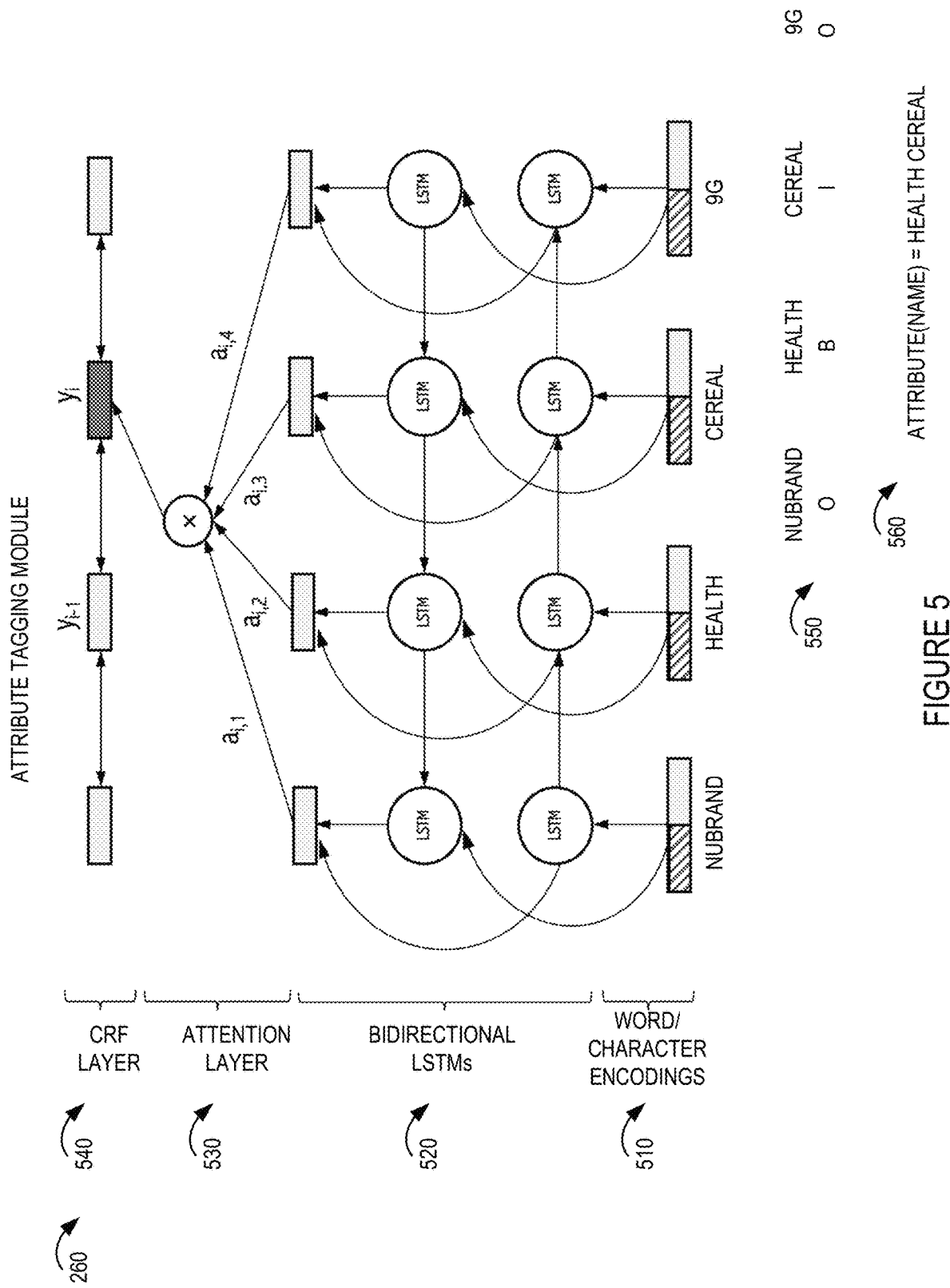
FIG. 5 depicts an example machine-learning technique for an attribute tagging module.

FIG. 5 depicts an example machine-learning technique for an attribute tagging module. The attribute tagging module 260 may receive word character encodings 510 from the text recognition module. Consider the example word character encodings 510 ("NUBRAND HEALTH CEREAL 9 G . . . "). The word character encodings 510 consists of a string of words that form a "sentence." However, only part of the sentence may be applicable to the attribute that is being searched in this iteration (the product attribute of "name"). In other iterations, different attributes may be tagged. The sentence may be represented as a vector which includes the word's character embedding and word embedding. The character embedding is initialized randomly. The word embedding usually is from a pre-trained word embedding file (such as an attribute list). All the embeddings will be fine-tuned during the training process. To properly identify which sequence of words in the sentence belong to the product attribute, a sequence labeling algorithm may be performed. The word character encodings 510 may be stored in a BiLSTM layer 520. As described in FIG. 4, in some implementations, the BiLSTM Layer 520 may include two sublayers. A variety of labels (tokens) may be assigned to each word. The tokens "B," "I," and "0" (which form the bases of the "BIO" sequence tagging technique) may indicate the type of token. BIO encoding is a common encoding used in sequence to sequence labelling task. A "B" token may indicate a beginning word of the attribute. An "I" token may indicate a continuing word in the attribute. An "0" token may indicate that the word is not related to the attribute. The use of BIO encodings may improve efficiency of the attribute tagging module by extracting one attribute each pass, while relying on BIO to represent all the tokens. The BiLSTM layer may produce scores that rank each term for their predicted classification to each of the token types. These scores (such as $a_{i,1}$, $a_{i,2}$, $a_{i,3}$, $a_{i,4}$) will be the inputs of the CRF layer 540.

An attention layer 530 may weight or magnify the scores by using a weighting value. The attention layer 530 may be connected to all the encoder states. The attention layer 530 may have access to all possible character image patches generated from the CNN. During training, the attribute tagging module may have ground truth information of the labels associated with each training input image. Ground truth information refers to the true label information (i.e., correct) for the training data. The ground truth information may be used to determine how well the model is performing.

The model may be used to predict the text supposedly present in the training input image. To measure how well the model is performing, one may compare the prediction to the text actually present in the image (the ground truth information). This comparison may be a measurement or indicator that qualifies as a valid distance metric. During training, the attribute tagging module may receive the text from the text recognition module and generate attribute information in textual format. The ground truth information also may be in textual format for comparison purposes. As part of the standard neural network training using back propagation, the system learns to give more importance to certain regions while generating each character. The importance is simply a function of the weights of the edges of the attention layer.

The scores predicted by the BiLSTM blocks (with attention weighting) are fed into the CRF layer 540. In the CRF layer 540, the label sequence which has the highest prediction score would be selected as the best answer. The CRF layer 540 can learn constraints from training data. For example, the CRF layer 540 could add some constraints to the final predicted labels to ensure they are valid. These constrains can be learned by the CRF layer automatically from the training dataset during the training process. The attribute tagging module 260 may be trained with various combinations of input word sequences and label sequences. The BiLSTM unit in the architecture captures the sequential information present in the input.

In some implementations, the training may be fine-tuned using temporal control over learning rate and early stopping conditions. Temporal control over learning rate and early stopping are techniques commonly understood in the field of fine tuning neural networks. Neural networks are trained by back propagation in which changes to different parameters are computed to arrive at the most optimal model. Learning rate may help control how significant a change should be made to those parameters. Research shows that using large learning rates at the initial stage of training and using smaller learning rates at the terminal stages of training may help the machine-learning system arrive at an optimal solution within a reasonable amount of time. The learning rate may be a function of time during the training process. One full cycle of back propagation on all that training data may be referred to as an epoch. The machine-learning system may be trained for a fixed number of epochs to develop the model. Ideally, the most optimal model is the one which makes the least error during the cross validation. Running the training process for a few extra epochs may improve error rates but miss out the most theoretically optimal model. To handle those cases, one may make the model stop training a little earlier (using an early stopping condition) based on the relative validation loss per epoch.

In the example of FIG. 5, the resulting "BIO" labels for the word character encodings 510 is shown at arrow 550. The term "NuBrand" was the beginning token "0" associated with a product name. The term "Health" was a beginning token "B" and the term "Cereal" was a continuing token "I" associated with the product name. The remaining terms ("9 G", etc.) were not related to the attribute and were assigned the disregarded token "0." As a result of the sequence labeling, the attribute tagging module 260 has properly determined that the attribute (product name) 560 for this word character encoding is "Health Cereal."

Figure 6:
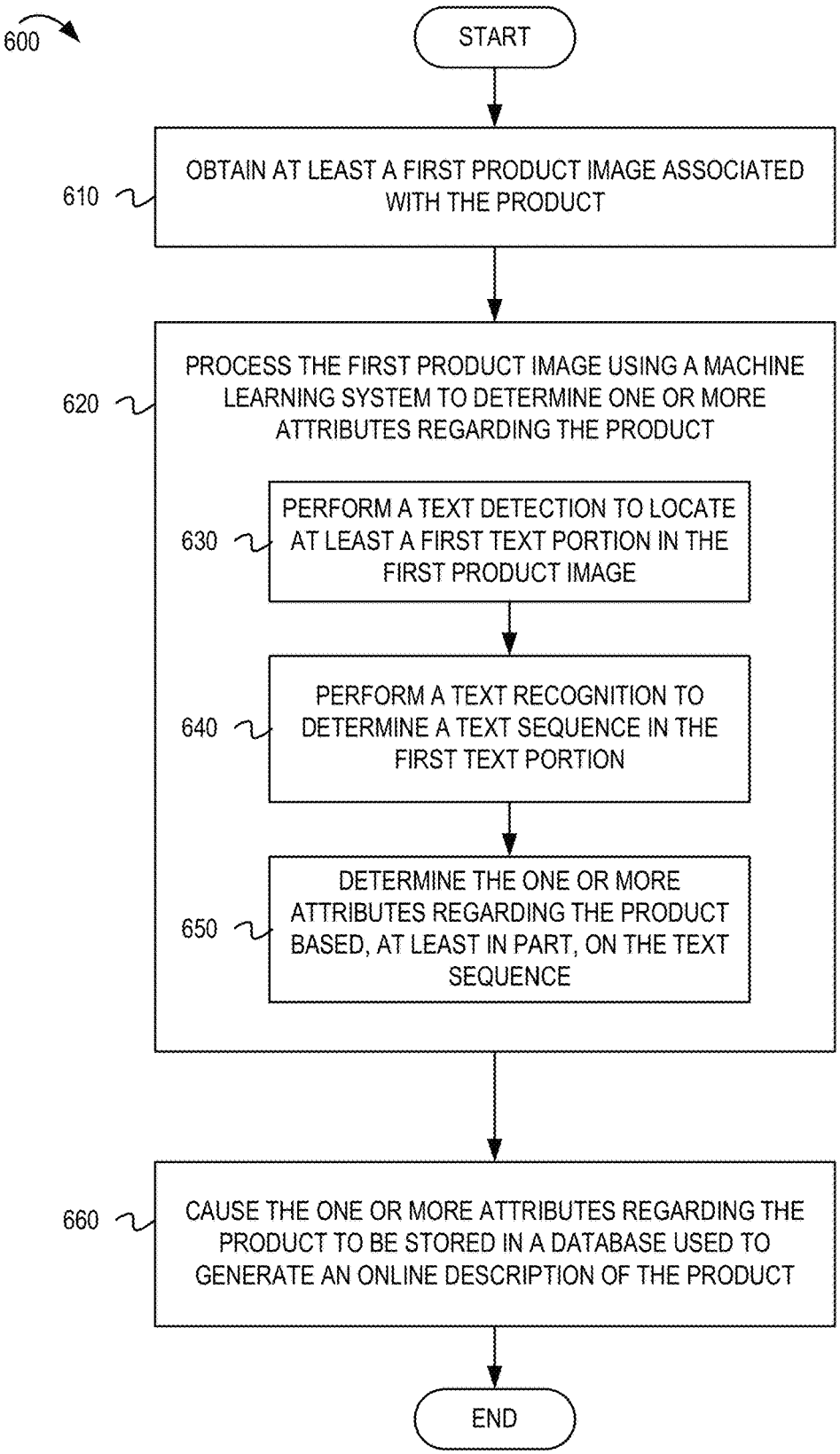
FIG. 6 depicts an example flowchart for automated extraction of product attributes from an image.

FIG. 6 depicts an example flowchart for automated extraction of product attributes from an image. The flowchart 600 begins at block 610.

At block 610, a machine-learning system may obtain at least a first product image associated with the product. For example, the first product image may be retrieved from a database or repository of product images or may be provided to the machine-learning system by an operator or online retailer.

At block 620, the machine-learning system may process the first product image to determine one or more attributes regarding the product. For example, at block 630, the machine-learning system may perform a text detection to locate at least a first text portion in the first product image. At block 640, the machine-learning system may perform a text recognition to determine a text sequence in the first text portion. At block 650, the machine-learning system may determine the one or more attributes regarding the product based, at least in part, on the text sequence.

At block 660, the machine-learning system may cause the one or more attributes regarding the product to be stored in a database used to generate an online description of the product. For example, the machine-learning system may output the one or more attributes to a message, file, script, or other formatted data that can be sent to the database.

Additional Example Scenarios

Aspects of the disclosure enable various additional scenarios. For example, the machine-learning system may be implemented by a product searching website that harvests data from multiple online retailers. In another example, the machine-learning system may be used for demand transference and identification of substitute products. For example, the machine-learning system may identify additional attribute information to match a product description with other products.

In other examples, the attribute extraction techniques in this disclosure may be used for artificial intelligence in non-commerce applications. For example, a machine-learning system may implement attribute extraction to analyze images of drug labels by a pharmacy and extract attributes related to a medication. Such attributes may include information to determine whether the drug is in compliance with regulations regarding the medication. The attribute extraction also may be used to obtain customer-specific information from drug labels, receipts, or other customer-provided data.

Example Operating Environment

Figure 7:
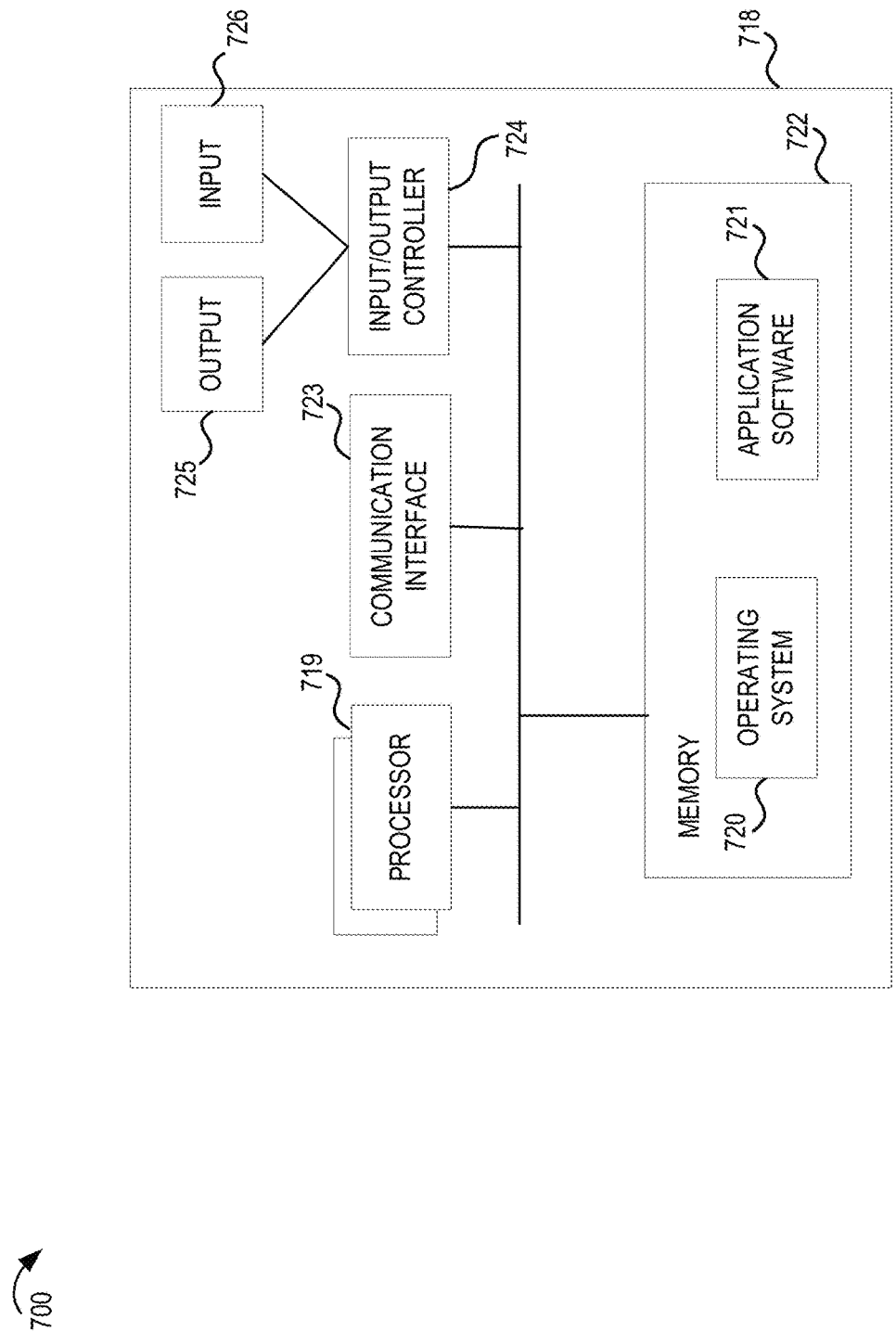
FIG. 7 depicts an example functional block diagram of an operating environment in which some aspects of this disclosure may be implemented.

FIG. 7 depicts an example functional block diagram of an operating environment in which some aspects of this disclosure may be implemented. In FIG. 7, a computing apparatus 718 may implement some or all of the machine learning model (and associated modules) described in this disclosure. In some implementations, a GPU may be used to provide the memory and processing capability to implement the machine-learning system. A memory that is based on deep neural network (such as NVIDIA® CUDA® Deep Neural Network library (cuDNN)) may be used in some implementations. The deep neural network may provide for standard routines such as forward and backward convolution, pooling, normalization, and activation layers. In one example implementation, the machine-learning system may be implemented using a NVIDIA® Tesla P100 (with 32 GB of memory), NVIDIA CUDA® Cores 3584, and Tensor-Flow® GPU. The training may be done on the configuration mentioned above whereas prediction can happen on any system with/without a GPU. The BiLSTM and CRF layers of the attribute tagging module may be implemented using the TensorFlow® background processes. In some implementations, the machine-learning system may be implemented using any deep-learning or tensor framework such as PyTorch, Torch, Theano, or the like.

In an embodiment, components of a computing apparatus 718 may be implemented as a part of an electronic device according to one or more embodiments described in this specification. The computing apparatus 718 comprises one or more processors 719 which may be microprocessors, controllers or any other suitable type of processors for processing computer executable instructions to control the operation of the electronic device. Platform software comprising an operating system 720 or any other suitable platform software may be provided on the computing apparatus 718 to enable application software 721 to be executed on the device. According to an embodiment, identifying a product, obtaining value per weight data and weight data associated with the product, and generating a digital product label including product ID data and product value data of the product as described herein may be accomplished by software.

Computer executable instructions may be provided using any computer-readable media that are accessible by the computing apparatus 718. Computer-readable media may include, for example, computer storage media such as a memory 722 and communications media. Computer storage media, such as a memory 722, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that the storage may be distributed or located remotely and accessed via a network or other communication link (e.g. using a communication interface 723).

The computing apparatus 718 may comprise an input/output controller 724 configured to output information to one or more output devices 725, for example a display or a speaker, which may be separate from or integral to the electronic device. The input/output controller 724 may also be configured to receive and process an input from one or more input devices 726, for example, a keyboard, a microphone or a touchpad. In one embodiment, the output device 725 may also act as the input device. An example of such a device may be a touch sensitive display. The input/output controller 724 may also output data to devices other than the output device, e.g. a locally connected printing device. In some embodiments, a user may provide input to the input device(s) 726 and/or receive output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternative Combinations

While the aspects of the disclosure have been described in terms of various examples with their associated operations, a person skilled in the art would appreciate that a combination of operations from any number of different examples is also within the scope of the aspects of the disclosure. Alternatively, or in addition to the other examples described herein, examples include any combination of the following:

obtaining at least a first product image associated with the product;

processing the first product image using a machine learning system to determine one or more attributes regarding the product;

causing the one or more attributes regarding the product to be stored in a database used to generate an online description of the product;

wherein the first product image depicts a packaging of the product, the packaging including textual information about the product;

performing a text detection to locate at least a first text portion in the first product image;

performing a text recognition to determine a text sequence in the first text portion;

determining the one or more attributes regarding the product based, at least in part, on the text sequence;

wherein the text detection is performed by a text detection module of the machine learning system;

wherein the text recognition is performed by a text recognition module of the machine learning system;

wherein the one or more attributes are determined by an attribute tagging module of the machine learning system;

generating synthetic images that include product-related vocabulary;

training the text recognition module using the synthetic images;

wherein the attribute tagging module is configured to determine a token for each word in a sentence output from the text recognition module, the token being either a starting token of a first attribute, a continuing token of the first attribute, or a disregard token if the word is unrelated to the first attribute;

training the attribute tagging module to identify words associated with each of a plurality of product attributes;

wherein the text detection module implements a connectionist text proposal network;

wherein the text recognition module implements a convolutional neural network;
wherein the attribute tagging module implements an attribute sequence recognition system;
wherein the text recognition module includes an attention layer;
wherein the attribute sequence recognition system includes a bidirectional long short-term memory layer with a conditional random field layer;
wherein the attribute sequence recognition system further includes an attention layer;
a text detection module of the machine learning system to perform the text detection;
a text recognition module of the machine learning system to perform the text recognition;
an attribute tagging module of the machine learning system to determine the one or more attributes;
means for obtaining at least a first product image associated with the product;
means for processing the first product image using a machine learning system to determine one or more attributes regarding the product;
means for causing the one or more attributes regarding the product to be stored in a database used to generate an online description of the product;
means for performing a text detection to locate at least a first text portion in the first product image;
means for performing a text recognition to determine a text sequence in the first text portion; and
means for determining the one or more attributes regarding the product based, at least in part, on the text sequence.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for enhancing product descriptions, the method comprising:
    obtaining at least a first product image associated with a product, the first product image including textual information about the product, the textual information being represented by at least one relevant portion of the first product image;
    executing a text recognition module to recognize text in the first product image, wherein executing the text recognition module includes executing an attention layer that emphasizes an area of the first product image to receive greater visual attention and emphasize word character sequence in the area of the first product image;
    processing the recognized text in the first product image using an end-to-end automated machine learning system (an ML system) for attribute tagging to determine one or more attributes associated with the product, wherein the attribute tagging includes assigning a token to each word of recognized text from the textual information, the token being either a starting token of an individual attribute, a continuing token of the individual attribute, or a disregard token if the word is unrelated to the individual attribute, and wherein the individual attribute is at least one of a term sequence or a character sequence; and
    storing the one or more attributes associated with the product in a database used to generate an online description of the product.

2. The method of claim 1, wherein the ML system combines a plurality of machine learning techniques in a sequence including at least:
    a first machine learning technique including a connectionist text proposal network (CTPN),
    a second machine learning technique including a convolutional neural network (CNN), wherein an output of the CTNP is an input for the CNN, and
    a third machine learning technique including an attribute sequence recognition system, wherein an output of the CNN is an input for the attribute sequence recognition system.

3. The method of claim 2, wherein the plurality of machine learning techniques includes machine learning techniques for:

performing a text detection to locate at least a first text portion in the first product image, wherein the first text portion is in the area of the first product image to receive greater visual attention;

performing the text recognition to determine a text sequence in the first text portion; and determining the one or more attributes regarding the product based, at least in part, on the text sequence.

4. The method of claim 3, further comprising:

wherein the text detection is performed by a text detection module of the machine learning system, wherein the text recognition is performed by the text recognition module of the machine learning system, and wherein the one or more attributes are determined by an attribute tagging module of the machine learning system.

5. The method of claim 4, further comprising:

generating synthetic images that include product-related vocabulary, the product-related vocabulary including product titles, product descriptions, and a sample unigram or sample bigram; and training the text recognition module using the synthetic images, wherein training the text recognition module optimizes and reduces perplexity of the text.

6. The method of claim 4, further comprising:

training the attribute tagging module to identify words associated with each of a plurality of product attributes.

7. The method of claim 4, further comprising:

wherein the text detection module implements the CTPN, wherein the text recognition module implements the CNN, and wherein the attribute tagging module implements the attribute sequence recognition system.

8. The method of claim 7, wherein the attention layer emphasizes the area of the first product image to receive greater visual attention based on weighted values of the first product image.

9. The method of claim 7, wherein the attribute sequence recognition system includes a bidirectional long short-term memory layer with a conditional random field layer.

10. The method of claim 7, wherein the attribute sequence recognition system further includes a second attention layer.

11. A system for enhancing product descriptions, the system comprising:

a processor; and memory coupled with the processor and having instructions stored therein which, when executed by the processor, cause the system to:

obtain at least a first product image associated with a product, the first product image including textual information about the product, the textual information being represented by at least one relevant portion of the first product image;

execute a text recognition module to recognize text in the first product image, wherein executing the text recognition module includes executing an attention layer that emphasizes an area of the first product image to receive greater visual attention and emphasize word character sequence in the area of the first product image;

process the recognized text in the first product image using an end-to-end automated machine learning system (an ML system) for attribute tagging to determine one or more attributes associated with the product, wherein the attribute tagging includes assigning a token to each word of recognized text from the textual information, the token being either a starting token of an individual attribute, a continuing token of the individual attribute, or a disregard token if the word is unrelated to the individual attribute, and wherein the individual attribute is at least one of a term sequence or a character sequence; and store the one or more attributes associated with the product in a database used to generate an online description of the product.

12. The system of claim 11, wherein the instructions to process the first product image include instructions which, when executed by the processor cause the system to:

perform text detection to locate at least a first text portion in the first product image;

perform text recognition to determine a text sequence in the at least first text portion; and determine the one or more attributes regarding the product based, at least in part, on the text sequence.

13. The system of claim 12, further comprising:

a text detection module of the machine learning system to perform the text detection;

a text recognition module of the machine learning system to perform the text recognition; and an attribute tagging module of the machine learning system to determine the one or more attributes.

14. The system of claim 13, wherein the text detection module includes a connectionist text proposal network, wherein the text recognition module includes a convolutional neural network, and wherein the attribute tagging module includes an attribute sequence recognition system, the attribute sequence recognition system including a bidirectional long short-term memory layer with a conditional random field layer.

15. The system of claim 14, wherein the text recognition module further includes a first attention layer, and wherein the attribute sequence recognition system further includes a second attention layer.

16. One or more non-transitory computer storage devices having computer-executable instructions stored thereon for enhancing product descriptions, which, on execution by a computer, cause the computer to perform operations comprising:

obtaining at least a first product image associated with a product, the first product image including textual information about the product, the textual information being represented by at least one relevant portion of the first product image;

executing a text recognition module to recognize text in the first product image, wherein executing the text recognition module includes executing an attention layer that emphasizes an area of the first product image to receive greater visual attention and emphasize word character sequence in the area of the first product image;

processing the recognized text in the first product image using an end-to-end automated machine learning system (an ML system) for attribute tagging to determine one or more attributes associated with the product, wherein the attribute tagging includes assigning a token to each word of recognized text from the textual information, the token being either a starting token of an individual attribute, a continuing token of the individual attribute, or a disregard token if the word is unrelated to the individual attribute, and wherein the individual attribute is at least one of a term sequence or a character sequence; and storing the one or more attributes associated with the product in a database used to generate an online description of the product.

17. The one or more non-transitory computer storage devices of claim 16, having computer-executable instructions stored thereon that, on execution by a computer, cause the computer to perform operations further comprising:

performing a text detection to locate at least a first text portion in the first product image;

performing a text recognition to determine a text sequence in the first text portion; and determining the one or more attributes regarding the product based, at least in part, on the text sequence.

18. The one or more non-transitory computer storage devices of claim 17, wherein the text detection is performed by a text detection module of the machine learning system, wherein the text recognition is performed by a text recognition module of the machine learning system, and wherein the one or more attributes are determined by an attribute tagging module of the machine learning system.

19. The one or more non-transitory computer storage devices of claim 18, wherein the text detection module includes a connectionist text proposal network, wherein the text recognition module includes a convolutional neural network, and wherein the attribute tagging module includes an attribute sequence recognition system, the attribute sequence recognition system including a bidirectional long short-term memory layer with a conditional random field layer.

20. The method of claim 1, further comprising identifying whether a sequence of words in a sentence belonging to the attribute is interrupted by at least one word not belonging to the attribute.

* * * * *